Nov. 13, 1928.

B. FORD 1,691,800

STORAGE BATTERY

Filed July 11, 1923

WITNESS:
Rob R Kitchel.

INVENTOR
Bruce Ford
BY Augustus B. Stoughton
ATTORNEY.

Patented Nov. 13, 1928.

1,691,800

UNITED STATES PATENT OFFICE.

BRUCE FORD, OF PHILADELPHIA, PENNSYLVANIA.

STORAGE BATTERY.

Application filed July 11, 1923. Serial No. 650,757.

The principal object of the present invention is to provide for connecting in a detachable manner a hold-down or handle and the wall of a jar or container made of rubber material or material analogous to rubber material. Other objects of the invention will appear from the following description.

The invention consists in the improvements to be presently described and finally claimed.

In the following description reference will be made to the accompanying drawings forming part hereof and in which Figure 1 is an elevational view of a structure embodying features of the invention.

Figure 3:
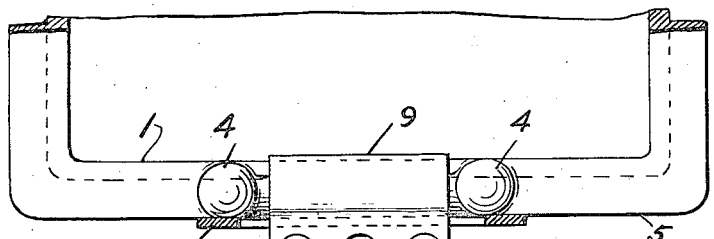
Fig. 3 is a sectional view taken on the line 3—3 of Figure 1 looking toward the bottom of the sheet.
Figure 1:
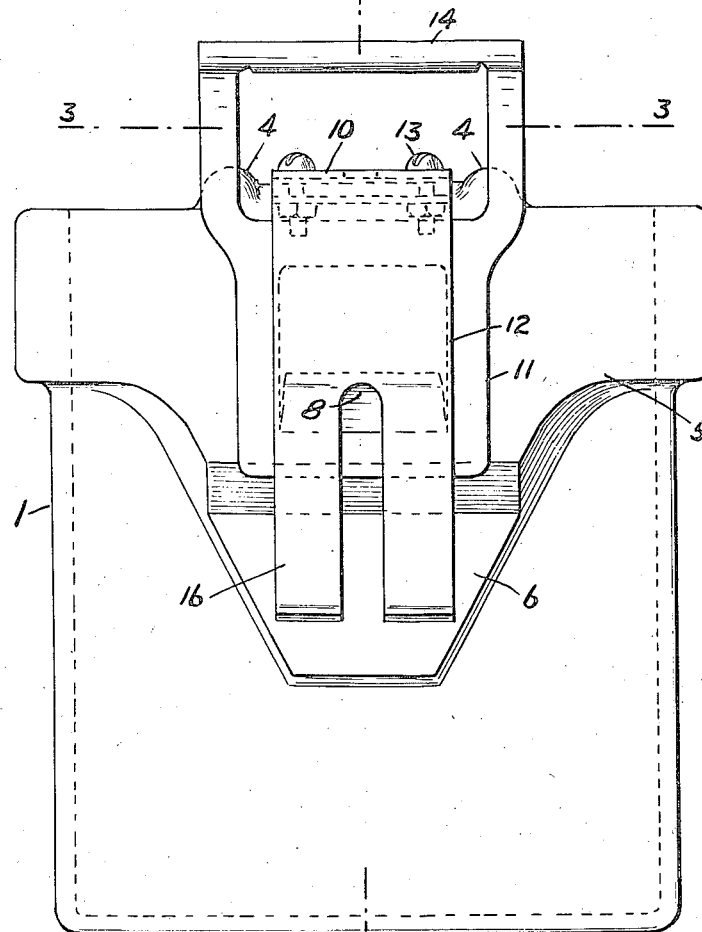
Figure 2:
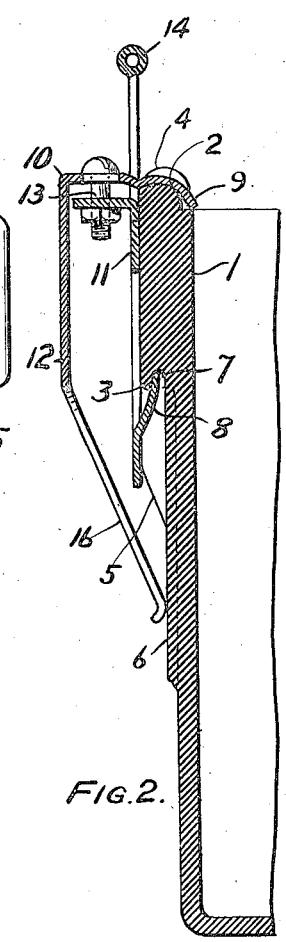
Fig. 2 is a sectional view taken on the line 2—2 of Figure 1.

In the drawings the wall 1 is provided with oppositely disposed cleats 2 and 3. As shown the cleat 2 is provided on the top edge of the wall and terminates in abutments 4, and as shown the cleat 3 is the overhanging wall of a recess provided in the wall 1. Frequently jars or containers of the type to which my invention is well adapted are strengthened around the top edge by a reinforcement 5 provided by increasing the thickness of the wall and at the very top the reinforcement is thicker than it is at 6, and as shown the part 6 is of the form of a depending blunt point. However, those are matters of detail but when the reinforcement is present it facilitates the provision of the recess 7, the wall 3 of which forms one of the cleats as has been said. 8 and 9 are the jaws which engage the cleats in order to secure together the metallic fitting 10 and the wall 1. Obviously the jaws may be made to engage the cleats in a variety of ways or by different means. As shown the metallic fitting is made in two parts 11 and 12 of plate form, the jaw 8 being connected with or struck up from the part 11, and the jaw 9 being a provision of the part 12, and the parts 11 and 12 are connected by bolts 13 which are an example of means for mechanically causing the jaws to engage the cleats. As shown the part 11 is rigidly provided with a handle 14, and the part 12 is provided with an opening 15 for a holddown connection not shown because too well understood in the art to require illustration. The part 12 is also provided with a foot 16 adapted to bear upon the face of the wall 1 and it is shown as forked for the accommodation of the hold-down.

In use the fitting can be readily applied to and removed from the wall by properly manipulating the bolts to cause the jaws to engage and disengage the cleats. The part of the element 11 which constitutes the shank of the jaw 8 when the latter is in engagement with the cleat 3, bears upon the face of the wall 1, so that the jar is properly supported even when lifted by one of its handles. The part 12 bears upon the cleat 2 through its jaw 9 and upon the face of the wall through its foot 16 so that it is well adapted to hold the jar down. The work done by the bolts 13 is therefore principally to provide for connecting and disconnecting the metallic fitting and the jar wall. The abutments 4 prevent sidewise displacement of the part 12. It may be remarked that the jaw 9 is arranged through an opening in the part 11 which opening also serves for the passage of the hand through the handle.

It will be obvious to those skilled in the art to which the invention relates that modifications may be made in details of construction and arrangement and mere matters of form without departing from the spirit of the invention which is not limited as to those matters or otherwise than as the prior art and the appended claims may require.

I claim:

1. In a storage battery container the combination of oppositely disposed cleats provided the one at the top of the container wall and the other at the face of the container wall, two relatively movable metallic elements of plate form and arranged in overlapping relation and of which each is provided with a jaw and of which one is rigidly provided with a handle and with a shank for contact with the face of the wall below the recess and of which the other is provided with a foot for hold-down purposes, and screw means interposed between said elements and operative in a plane parallel to the container wall and arranged to move said jaws towards and away from each other.

2. In a storage battery container the combination of oppositely disposed cleats provided at the same end wall and of which one is at the top of the wall and the other is located between the top and bottom of the wall, and a metallic fitting confined within the area of said wall and having an upwardly extending handle and confronting jaws adapted to engage said cleats, said fitting having a depending foot adapted to bear upon the face of said wall below said cleats.

BRUCE FORD.